UNITED STATES PATENT OFFICE.

ANDREW L. MATHEWS, OF TOLEDO, OHIO.

PROCESS OF MAKING SUGAR.

1,097,724.  Specification of Letters Patent.  Patented May 26, 1914.

No Drawing. Application filed June 14, 1913. Serial No. 773,733.

*To all whom it may concern:*

Be it known that I, ANDREW L. MATHEWS, a citizen of the United States of America, and a resident of Toledo, in the county of Lucas and State of Ohio, have invented certain new and useful Improvements in Processes of Making Sugar, of which the following is a specification.

This invention relates to processes of making sugar; and it comprises a process of producing a high grade sugar in large yield directly from cane juice, and other sugar juices relatively rich in reducing sugar or "glucose," wherein such juices are treated with lime in excess over the amount sufficient to neutralize, such treatment being at a temperature too low to permit any substantial attack on the glucose by such lime, and the excess of lime is then removed, as by gasing with carbon dioxid, this treatment with lime and removal of lime being performed one or more times; all as more fully hereinafter set forth and as claimed.

The object of this invention is to provide a simple and effective treatment for cane juice, and like juices, for the direct production of a white granulated sugar not requiring further refining, with the simultaneous production of a high grade molasses.

Cane juice is an impure liquid containing in addition to cane sugar, comparatively large amounts of reducing sugars, or "glucose," and of non-saccharine matter. In the manufacture of sugar these non-saccharine matters are removed as perfectly as may be and the purified or defecated juice is then evaporated to yield crystallized sugar and molasses. Upon the completeness of the juice purification depend the quality and quantity of cystallized sugar obtained and the quality of the molasses. By the usual methods of operation the sugar so obtained is not suitable in quality for direct consumption, being, even when exhaustively washed, not better than "off-white" in grade, so that it is practically always sent to a refinery to be redissolved and recrystallized. Neither is its quantity as large as it should be, the non-saccharine impurities in the molasses having a melassigenic effect; that is, having the power of keeping a certain proportion of cane sugar from crystallizing.

Ordinarily defecation or purification is performed by bringing the juice to a boil in the presence of just enough lime to nearly neutralize while not making the liquid alkaline; that is, the addition of lime is in such small quantity as to leave none existing as free lime. If anything, the juice must be left slightly acid. Occasionally, instead of boiling the liquid, it is heated to a higher temperature under pressure for a brief time. From the hot nearly neutral liquid there separates a precipitate of coagulated albuminoids, insoluble lime salts, etc., together with any fiber or dirt which may be present. After separating this precipitate, the bright liquid is sent to the evaporators. It is well recognized that heating is necessary in defecation; and that in the heating if not enough lime is added the purification is not very good while the acids of the juice will act on the sugar to convert it into glucose, causing a loss. On the other hand, if too much lime is used, it acts on the glucose of the hot juice to form dark caramel-like bodies of melassigenic properties, rendering it impossible to obtain anything from the juice on boiling down but soft grained brown sugars. This blackening of the juice by an excess of lime is one of the bugbears of the ordinary operation; and is responsible for the usual practice of "clarifying on the acid side" with its attendant loss of sugar and incomplete purification.

I have found however, that an excess of lime is not only not dangerous with cane juice and similar liquids containing glucose, but may be used with advantage provided certain limits of time and temperature be observed: that if the exposure be not too long, say, not over an hour, glucose is not attacked to any substantial extent by lime at temperatures below 50° C. Cane juice I find may be safely, and advantageously, "overlimed" or made alkaline with lime, at these low temperatures. The time of exposure to the action of alkali should always be short, but is in some degree inversely as the temperature; below 40° C. it may be somewhat prolonged. This fact allows me to secure an efficient lime purification of cane juice, and similar liquids containing, relatively, large amounts of glucose. In the presence of a relatively large amount of lime much more impurity is separable from a given juice, than with smaller amounts; and at low temperatures this efficient removal is not countervailed by the production of more impurities at the expense of the glucose as is the case at higher temperatures. While heating is always necessary in purifying sugar juices, in the present invention I simply postpone heating till after the lime has exercised its action and has been removed. No destruction of the glucose to produce dark bodies occurring while the removal of impurities from the juice is greater than usual, the molasses obtained in the present process is high grade.

In a practical embodiment of my process, I find it advantageous to work in a certain methodical way within certain limits of alkalinity and acidity. I may first treat the juice with about 1 to 6 or 7 per cent. of lime, the amount depending to a large extent on the acidity of the juice. Enough should be used to make the juice strongly alkaline, to the usual tests, such as litmus. Any suitable lime may be used, but it is best to employ a good fat lime containing little magnesia and as rich as possible in CaO. The lime may be employed as milk of lime or powdered caustic lime, lime slaked in juice, etc., and may be added in or by means of any convenient apparatus. This excess of lime is next removed by carbonatation by passing in carbonic acid gas, from any convenient source, such as products of combustion, lime kiln gases, etc., till a sample of juice shows a precipitate breaking quickly and settling readily; a condition where the juice is not yet acid and will filter or settle readily. At this point the juice will show an alkalinity corresponding to 0.03 to 0.20 per cent. of lime (CaO), using phenolphthalein as an indicator. Introduction of gas is now stopped and the liquid is filtered or settled or both. The whole operation should be conducted at a temperature not above 50° C. to prevent damage to the glucose by the lime and is advantageously at a temperature around 40° C., as this temperature while not sufficient to cause injury to glucose gives efficient clarification.

After removal of the precipitate at or about this alkalinity, the clear solution is again gased. A little lime may be again added at this stage to give bulk to the new precipitate. A slight addition of lime at this stage also aids in purification. The introduction of gas is stopped when the residual lime in solution is removed, or substantially so, the solution being practically neutral to phenolphthalein. The liquid can now be safely heated and this is done, the temperature being raised to 90° C. or above. This heating coagulates and separates albuminoids, lime salts, etc., and heat-sensitive impurities and the slight precipitation of calcium carbonate from the residual or added lime, gives bulk to the precipitate caused by heat and makes it easier to handle. Carbonatation in this stage must not be carried beyond the neutral point as this would tend to redissolve some of the calcium carbonate.

After the heating operation, the liquid is filtered or settled, or both, and the clear liquid is now brought to neutrality or very slight acidity using litmus by any suitable acid body, such as acid phosphate. Sulfurous acid, made from burning sulfur is well adapted for the present purposes. The final reaction may advantageously, and particularly where sulfur dioxid is used, be left a little on the acid side, say, with a final acidity such that 10 cc. of clear juice would correspond to about 0.5 to 1 cc. of N/10 (tenth normal) acid. The liquid may now be evaporated to grain in the usual manner and with the usual purging in the centrifugal, the massecuite will give a hard crystalline white sugar suitable for direct consumption. The molasses of the massecuite is as light colored as that of a massecuite from acid purified juice while it contains much less impurity so that the yield of high grade white sugar is higher while the molasses recovered is better.

The present process may be used with sorghum juice which is usually even more sensitive to lime than cane juice; and it may also be used with other sugary liquids containing relatively large amounts of glucose such as those obtained in refining raw sugars. A slight acidity with sulfurous acid produced in the juice after the stated treatment does not produce inversion (conversion of sugar to glucose) and makes a bright colored juice and molasses as well as a whiter sugar.

What I claim is:—

1. The process of purifying sugar juices containing relatively large amounts of glucose which comprises making such liquid alkaline with lime while maintaining such liquid at a temperature not above 50° C., removing the alkalinity without making the liquid acid and thereafter heating the liquid in a neutral condition to a higher temperature to remove impurities precipitated by heat.

2. The process of purifying sugar juices containing relatively large amounts of glucose which comprises making such liquid alkaline with lime while maintaining such liquid at a temperature of about 40° C., removing the alkalinity without making the liquid acid and thereafter heating the liquid in a neutral condition to a higher temperature to remove impurities precipitated by heat.

3. The process of purifying sugar juices containing relatively large amounts of glucose which comprises making such liquid alkaline with lime while maintaining such liquid at a temperature not above 50° C., removing nearly all the alkalinity with carbon dioxid, separating the precipitate, again adding carbon dioxid to the clear liquid till neutrality is obtained and heating to a higher temperature to remove impurities precipitated by heat.

4. The process of purifying sugar juices containing relatively large amounts of glucose which comprises making such liquid alkaline with lime while maintaining such liquid at a temperature not above 50° C., removing nearly all the alkalinity with carbon dioxid, separating the precipitate, again adding carbon dioxid to the clear liquid till neutrality is obtained, heating to a higher temperature to remove impurities precipitated by heat, removing such impurities and feebly acidulating.

5. The process of purifying sugar juices containing relatively large amounts of glucose which comprises making such liquid alkaline with lime while maintaining such liquid at a temperature not above 50° C., removing nearly all the alkalinity with carbon dioxid, separating the precipitate, again adding carbon dioxid to the clear liquid till neutrality is obtained, heating to a higher temperature to remove impurities precipitated by heat, removing such impurities and feebly acidulating with sulfur dioxid.

In testimony whereof I have signed this specification in the presence of two subscribing witnesses.

ANDREW L. MATHEWS.

Witnesses:
H. M. MARBLE,
PAUL H. FRANKE.